United States Patent [19]

Lanfranconi et al.

[11] Patent Number: 4,642,415

[45] Date of Patent: Feb. 10, 1987

[54] JOINT FOR INTERCONNECTING TWO ELECTRICAL CABLES OF DIFFERENT TYPES

[75] Inventors: Gianmario Lanfranconi, Trezzo D'Adda; Bernardino Vecellio, Milan, both of Italy

[73] Assignee: Societa' Cavi Pirelli S.p.A., Milan, Italy

[21] Appl. No.: 809,156

[22] Filed: Dec. 16, 1985

[30] Foreign Application Priority Data

Dec. 17, 1984 [IT] Italy ................................ 24089 A/84

[51] Int. Cl.⁴ ............................................. H02G 15/25
[52] U.S. Cl. .................................. 174/22 R; 156/310; 174/84 R
[58] Field of Search ...................... 174/20, 21 R, 21 C, 174/22 R, 22 C, 84 R, 88 R, 88 C, 91; 156/310

[56] References Cited

U.S. PATENT DOCUMENTS 4,184,005  1/1980  Bauriedel et al. ............... 156/310 X
4,234,758  11/1980  Guzy ................................. 174/84 R

FOREIGN PATENT DOCUMENTS 211618  11/1957  Australia ............................ 174/22 R Primary Examiner—Laramie E. Askin
Attorney, Agent, or Firm—Brooks Haidt Haffner & Delahunty

[57] ABSTRACT

A joint between a pair of electrical cables of different types, such as an oil filled cable and a cable with extruded insulation. Both cable ends have tapered insulation and stepped layers outwardly of the insulation and the conductor of one cable is mechanically and electrically connected to the conductor of the other cable by a rod surrounded by a body of insulation. Portions of the insulation at opposite ends of the body and the tapered insulations are respectively covered by insulation applied thereto during installation of the joint. The tapered insulation of the oil filled cable is enclosed by a housing in fluid tight engagement with the body and the sheath of the oil filled cable and filled with the oil of the oil filled cable. The insulation surrounding a portion of the body and the tapered insulation of the cable with extruded insulation is adhesively bonded to such portion of the body.

10 Claims, 2 Drawing Figures

JOINT FOR INTERCONNECTING TWO ELECTRICAL CABLES OF DIFFERENT TYPES

This application is related to application Ser. No. 809,147 filed Dec. 16, 1985 in the names of Giancarlo Giorgio and Bruno Parmigiani and entitled "Stop Joint For Interconnecting Two Electrical Cables of Different Types", the latter application being assigned to the assignee of the subject application.

The present invention relates to a stop joint between cables of two different types, one type of cable having an extruded insulation and the other type of cable having both insulation and a dielectric fluid, such as oil-filled cables, the so-called "pipe" type cables, gas-insulated cables, and compound insulated cables. Both types of cables may have a single-core or multiple cores.

The joints used up to now to connect cables having an extruded insulation and cables having an insulation assisted by a dielectric fluid comprise, at each end of the cables, a sealing end of specific type to finish the cable on which said sealing end is mounted, a mechanical and electrical connection between the lugs of the sealing ends and a metal box, filled with an insulating fluid, which tightly encloses the sealing ends.

The known joints, the structure of which has been briefly described hereinbefore, although differing from one another in their particular constructions, are of complex construction. Therefore, their installation is difficult and requires skill especially in the case in which said known joints must be used for high voltages where the high electric stresses involved can cause the putting out of service of the joints in presence of even small imperfections in the installation.

Another drawback of the known joints of the type to which the invention relates is that these latter have a considerable radial size and specifically provide a greater encumbrance in radial direction that the known joints between cables of the same type.

The greater encumbrance of the known joints of the type to which the invention relates with respect to the known ones between cables of the same type is substantially due to the presence of the box filled with a dielectric fluid which encloses the two sealing ends fitted around the ends of the cables.

The great radial encumbrance of the known joints of the type to which the invention relates represents a drawback since it impedes the use in all those situations in which the laying of an electric line comprising cables having an extruded insulation and cables having an insulation assisted by a dielectric fluid must be effected in pre-existing structures, such as, for example, the foundations of industrial buildings, the structure of bridges and the like which impose limitations in the radial direction to the components of the line.

Moreover, in the case of lines which have already been laid and which are formed by a plurality of cables, for instance, all oil-filled cables, it can be impossible to substitute a portion of an oil-filled cable with a portion of an extruded-insulation cable due only to the great encumbrance of the known joints necessary to carry out the connection between cables of different types.

In fact, if the cavity in which the joint has to be housed is in a structure which has radial dimensions suitable only for a joint between oil-filled cables, this cavity is not able to house a known joint of the type to which the present invention relates due to the greater radial dimensions of such known type of joint.

One object of the present invention is to provide a joint between a cable having an extruded insulation and a cable having an insulation assisted by a dielectric fluid which has the radial size smaller than the known joints and in particular, presents an encumbrance in the radial direction substantially of the same order of magnitude as that of the known joints used for the connection between cables of the same type and which has a simple structure and, therefore, can be rapidly installed and is reliable even when utilized in the field of high voltages.

The principal object of the present invention is a joint between cables having extruded insulation and cables having insulation assisted by a dielectric fluid, characterized by the fact of comprising:

(1) at least a through insulator constituted by a body formed from a compound based on epoxy resins embedding a metal bar or rod, the ends of which project from the tapered, truncated-cone shaped ends of the insulator body;

(2) a metal box, tightly connected to the insulator and to the metal sheath of the cable having the insulation assisted by a dielectric fluid and surrounding a first mechanical and electrical connection between the conductor of the latter cable and the bar or rod of the insulator and a stratified insulation encircling the first connection, said metal box being completely filled with the dielectric fluid of the cable;

(3) a second mechanical and electrical connection between the conductor of the extruded insulation cable and the bar or rod of the through insulator; and (4) an insulation of cross-linked material covering the second connection, said insulation of cross-linked material being bonded to the extruded insulation of the cable and to the insulator by means of bonds of a chemico-physical nature.

Other objects and advantages of the present invention will be apparent from the following detailed description of the presently preferred embodiments thereof, which description should be considered in conjunction with the accompanying drawings in which.

Figure 1:
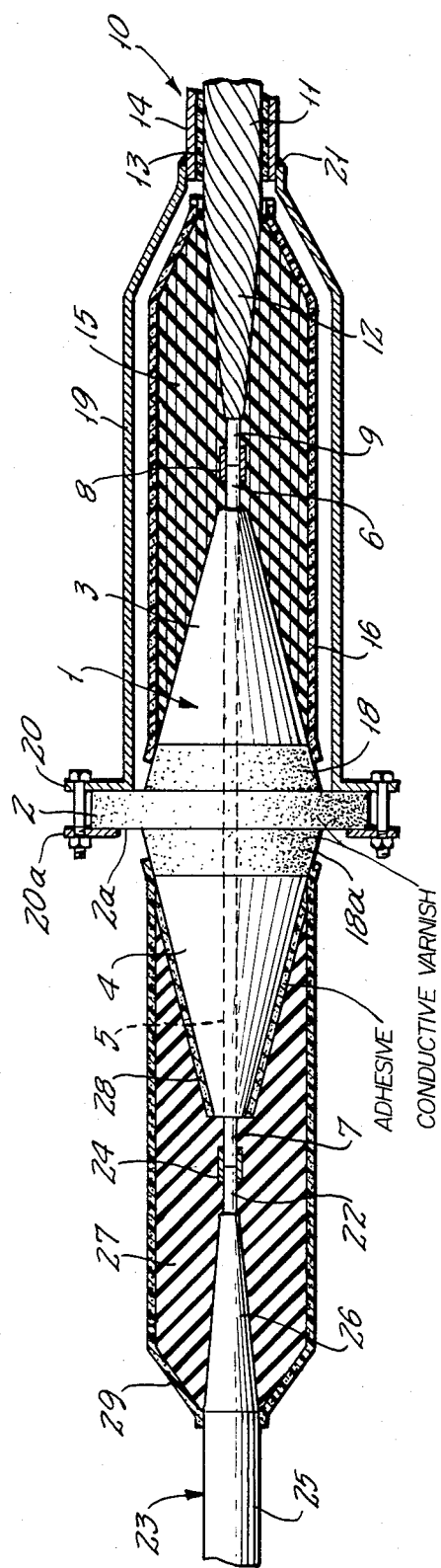
FIG. 1 is a lateral view, partially in cross-section of a joint according to the present invention.

As shown in FIG. 1, the joint comprises an insulator 1 constituted by a body made of a compound based on epoxy resins of a type known per se. The insulator 1 has a central zone 2 and end portions 3 and 4 which are tapered according to a truncated-cone configuration. The central zone 2 and the root portions 18 and 18a of the ends 3 and 4 of the insulator 1 are covered with a conductive varnish.

A metal bar or rod 5, which may be made of aluminum, is embedded in the insulator 1 and the end portions 6 and 7 of the bar 5 project from the end portions 3 and 4 of the insulator body.

The previously described insulator 1 has the same structure as that of the insulators of the stop joints between oil-filled cables.

The end portion 6 of the bar 5 is connected in a way known per se, for example, by a ferrule 8 or a weld or the like, to the conductor 9 of a cable having the insulation assisted by a dielectric fluid, e.g., an oil-filled cable 10.

The end of the oil-filled cable 10 present in the joint is prepared by stepwise stripping of a part 12 of the solid stratified insulation 11, giving it a truncated-cone, tapered shape and stripping of the outer semi-conductive layer 13 and the metal sheath 14 of the cable itself.

An insulation 15, formed by winding paper tapes which cover both the truncated-cone end portion 12 of the insulation of the oil-filled cable 10 and the end portion 3 of the insulator 1, is provided around the mechanical and electrical connection between the end portion 6 of the bar 5 and the conductor 9 of the oil-filled cable 10.

In the alternative, the insulation 15 can be formed by a plurality of superimposed cylindrical sleeves, each of which is formed in place and by winding crepe paper tape. Each sleeve is terminated at the tapered surfaces of the insulator and of the cable insulation.

A semi-conductive layer 16 encircles the insulation 15 and overlaps the outer semi-conductive screen 13 of the oil-filled cable 10 and extends to the root 18 of the end 3 covered with a conductive varnish.

A metal box 19 surrounds the parts described and is tightly connected, in fluid-tight relation at one end to a flange 2a at the central zone 2 of the body of the insulator 1 by means of a flange 20 and counter-flange 20a and at the other end is tightly connected, in fluid-tight relation, to the metal sheath 14 of the oil-filled cable 10 by means of a weld 21.

The end portion 7 of the bar 5 of the insulator 1 is mechanically and electrically connected to the conductor 22 of a cable 23 having a cross-linked, extruded insulation, for instance, made of compounds based on EPR, EPDM, by means of a ferrule 24 or a weld or the like.

The end portion 26 of the cable having the cross-linked, extruded insulation has its insulation tapered according to a truncated-cone configuration and is removed from an end portion of the conductor 22. The outer semi-conductive screen 25 is also stripped from the end portion 26.

The mechanical and electrical connection between the conductor 22 of the cross-linked, extruded insulation cable and the bar 5 is encircled by insulation 27 which is hereinafter described in detail.

The insulation 27 covers also the truncated-cone tapered end portion 26 of the insulation of the cable 23 and the end portion 4 of the insulator 1, except for the root 18a of said end portion 4 which is covered with a conductive varnish.

The insulation 27 is preferably formed by winding a plurality of tapes of cross-linkable material, for instance, of cross-linkable EPR, which following its cross-linking, carried out under pressure after the formation of the insulation 27, gives rise to the formation of a monolithic and compact body and permits the obtaining, with the known techniques for the elastomer-working, a bond of chemico-physical nature between the end portion 26 of the extruded insulation and the insulation 27.

As previously stated, the insulation 27 also covers the end portion 4 of the insulator 1 and is bonded to this latter by bonds of chemico-physical nature. The bond of chemico-physical nature between the insulation 27 and the end portion 4 of the insulator 1 preferably is obtained by means of a layer of adhesive material 28 which is interposed between them and which acts as a connecting bridge between the material of the insulator 1, constituted by a compound based on epoxy resins, and the material of the insulator 27 constituted by a cross-linked elastomeric material, for example, cross-linked EPR.

The layer 28 can be formed by using an adhesive material which has the following properties:

(a) it assures the absence of bubbles or cavities of the smallest dimension between the surfaces of the insulator 1 and the cross-linked insulation 27 bonded by said material; and (b) the bonding realized through the adhesive between the material constituting the insulator body and the cross-linked insulation should have a mechanical stripping strength not lower than 1 kg/cm$^2$ and at least a mechanical strength sufficient to avoid the smallest separation of the elements bonded by said adhesive under the mechanical stresses which can arise in the joint during laying or operation.

In particular, the adhesive material for the layer 28 can be one which results from the use of one of the different materials existing in the market to realize a bond between materials based on epoxy resins and a material based on cross-linked EPR forming the cross-linked insulation. Examples of such adhesive materials are the product commercially known as "4400" and manufactured by HENKEL, and the product commercially known as "THIXON 508" manufactured by the Dayton Chemical Division.

A layer of semi-conductive material 29, constituted, for example, by a conductive varnish, covers the insulation 27 and overlaps the semi-conductive layer 25 of the extruded insulation cable 23 and the root 18a of the end portion 4 of the insulator 1 which is covered with a conductive varnish.

Figure 2:
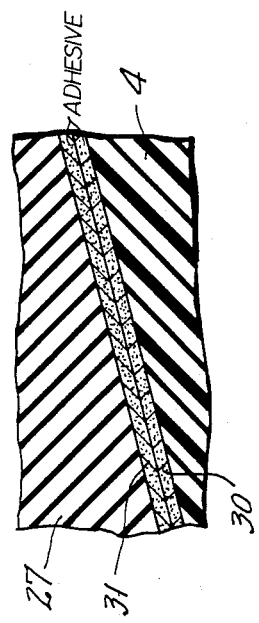
FIG. 2 is an enlarged, fragmentary cross-section of a joint according to an alternative embodiment of the invention.

FIG. 2 illustrates a detail of an alternative embodiment of a joint according to the present invention.

The joint according to this alternative embodiment differs from the embodiment of FIG. 1 only in the manner of providing the chemico-physical bond between the insulating material 27 and the end portion 4 of the insulator 1.

As shown in FIG. 2, the bond between the insulation 27 and the end portion 4 is obtained by forming two superimposed adhesive layers of a different nature and more precisely, by a first adhesive layer 30 in direct contact with the surface of the end portion 4 of the insulator 1 and by a second adhesive layer 31 covering the layer 30 and in direct contact with the insulation 27 of vulcanized material.

In this embodiment, the adhesive material forming the layer 30 is of a type suitable for realizing a very good chemico-physical bond with the material based on epoxy resin of the end portion 4, while the layer 31 is formed by means of an adhesive material particularly suitable for realizing a chemico-physical bond with the cross-linked elastomeric material, for example, of EPR, of the insulation 27. Moreover, the adhesive materials forming the layers 30 and 31 are of a type suitable for realizing between them a particularly efficacious chemico-physical adhesion.

The layers 30 and 31 can be formed by means of adhesive materials having the following properties:

A. they can assure the absence of bubbles or cavities of the smallest dimension between the insulator 1 and the cross-linked insulation 27 bonded by said materials; and B. the bonding realized with the two adhesives between the material forming the insulator body and the cross-linked insulation should have a mechanical stripping strength not lower than 1 kg/cm$^2$ and at least a mechanical strength able to avoid the smallest separation between the elements which are bonded under the mechanical stresses which can arise in the joint during laying or operation.

In particular, the adhesive material for the layer 30 can be one which results from the use of one of the various materials existing on the market to realize a bond with the materials based on epoxy resins and the adhesives compatible for the bond with cross-linked materials based on EPR.

Moreover, the adhesive material for the layer 31 can be that which results from the use of one of the various materials existing on the market to realize a bond with the cross-linked materials based on EPR and the adhesives compatible for the bond with the materials based on epoxy resins.

Examples of materials for the layer 30 are the product commercially known as "chemosil 211" manufactured by HENKEL and the product commercially known as "THIXON 508" manufactured by Dayton Chemical Division.

Examples of materials for the layers 31 are the product commercially known under the trademark "X2311" manufactured by HENKEL and the product commercially known under the trademark "P7" manufactured by Dayton Chemical Division.

The embodiments shown in the drawing of a stop joint according to the present invention relate to single-core cables, but this is not to be understood in a limiting sense, since by means of the joints according to the present invention it is possible to effect the connection also between multi-core cables having an extruded insulation and multi-core cables having the insulation assisted by a dielectric fluid. In this latter case, the insulators 1 to be provided will be equal in number to the number of the cores of the cables.

The difference in this latter case will be that the central zones 2 of the insulators 1 will be secured to each other in a tight manner. For example, the central zones 2 could be part of a single monolithic plate of an epoxy resin covered with a conductive varnish.

In the alternative, the insulators 1 can be tightly received in openings in a plate of metallic material, for example, made of non-magnetic steel.

From the previously set forth description and from the following considerations, it will be understood that by means of the joints according to the present invention, the objects of the invention are attained.

First of all, the thicknesses of the insulations in the joints according to the invention which encircle the connections between cables and the insulators 1 are practically equal to the thickness of the insulations found in the joints between cables of the same type. Thus, the radial encumbrance presented by the joints of the invention is reduced as compared to the prior art type of joints.

Moreover, the joints according to the invention are easily and simply installed since they are obtained by assembling together pre-fabricated elements, such as the insulators 1 and the metal box 19, and their installation involves only a tape winding operation according to a known technique for the formation of the insulations.

Finally, the close contact, realized through the chemico-physical bonds between the material based on epoxy resins of the insulator 1 and the insulation 27 encircling the mechanical and electrical connection of said insulator with the extruded insulation cable permits the overcoming of those risks of electrical perforations of the joint which could arise, especially at high voltages, in the absence of said close contact due to the possible presence of small quantities of air in the zone of contact between the insulator 1 and the insulation 27.

Therefore, the joints of the invention, in addition to being easily and rapidly installable, are very reliable especially when used in connection with high voltages.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Joint between two electrical cables of different types, each of said cables having a conductor and the conductor of one of said cables being insulated with layers of solid insulation impregnated with a dielectric fluid and said one of said cables having a sheath around said insulation and the other of said cables having extruded solid insulation around the conductor thereof, said joint comprising:

a body of insulating material enclosing a metal rod except at end portions thereof, one end portion of said rod extending from one end of said body and the other end portion of said rod extending from the other end of said body;

first connecting means mechanically and electrically connecting said one end portion of said rod to the end of the conductor of said one of said cables having said layers of solid insulation;

further layers of solid insulation around said first connecting means, around a portion of the insulating material of said body adjacent said one end portion of said rod and around a portion of said layers of insulation of said one of said cables;

a conductive metal enclosure around said further layers of solid insulation and said first connecting means and connected in fluid-tight relation at one end with said sheath and at the opposite end with said body to provide a fluid-tight enclosure around said solid insulation and said first connecting means;

dielectric fluid of said one of said cables in said enclosure;

second connecting means mechanically and electrically connecting said other end portion of said rod to the end of the conductor of said other of said cables having said extruded solid insulation and further solid insulation around said second connecting means, around a portion of the insulating material of said body adjacent to said other end portion of said rod and around a portion of the extruded solid insulation of said other of said cables adjacent to said second connecting means, said further solid insulation being without dielectric fluid and being bonded to said last mentioned portion of the insulation material of said body.

2. A joint as set forth in claim 1 wherein said insulating material of said body is an epoxy resin compound and said further solid insulation comprises a cross-linked polymer.

3. A joint as set forth in claim 2 wherein said further solid insulation is a monolithic body formed from tapes of a cross-linkable polymer.

4. A joint as set forth in claim 1 wherein said further solid insulation is also bonded to said portion of said extruded solid insulation of said other of said cables.

5. A joint as set forth in claim 1 wherein said further solid insulation is bonded to said portion of said insulating material of said body by an adhesive which adheres to both said portion of said insulating material of said body and said further solid insulation with sufficient separation strength to prevent separation of said last-mentioned portion and said further solid insulation during handling and operation of said other of said cables.

6. A joint as set forth in claim 1 wherein said further solid insulation is bonded to said portion of said insulating material of said body by two layers of adhesive, one of said layers being in contact with and bonded to said further solid insulation and the other of said layers and the other of said layers being in contact with and bonded to said last-mentioned portion.

7. A joint as set forth in claim 6 wherein each of said layers is formed by a different adhesive.

8. A joint as set forth in claim 6 wherein the adhesive of each layer is a cross-linkable material.

9. A joint as set forth in claim 1 wherein the insulating material of said body has an outer surface of a decreasing taper in both directions from a portion of the body intermediate its ends toward the ends of said body.

10. Joint between two electrical cables of different types, each of said cables having a conductor and the conductor of one of said cables being insulated with layers of solid insulation impregnated with a dielectric fluid and said one of said cables having a sheath around said insulation and the other of said cables having extruded solid insulation around the conductor thereof, said joint comprising:
- a body of insulating material enclosing a metal rod except at end portions thereof, one end portion of said rod extending from one end of said body and the other end portion of said rod extending from the other end of said body;
- first connecting means mechanically and electrically connecting said one end portion of said rod to the end of the conductor of said one of said cables having said layers of solid insulation;
- further layers of solid insulation around said first connecting means, around a portion of the insulating material of said body adjacent said one end portion of said rod and around a portion of said layers of insulation of said one of said cables;
- a conductive metal enclosure around said further layers of solid insulation and said first connecting means and connected in fluid-tight relation at one end with said sheath and at the opposite end with said body to provide a fluid-tight enclosure around said solid insulation and said first connecting means;
- dielectric fluid of said one of said cables in said enclosure;
- second connecting means mechanically and electrically connecting said other end portion of said rod to the end of the conductor of said other of said cables having said extruded solid insulation; and
- further solid insulation around said second connecting means, around a portion of the insulating material of said body adjacent to said other end portion of said rod and around a portion of the extruded solid insulation of said other of said cables adjacent to said second connecting means, said further solid insulation being bonded to said last mentioned portion of the insulating material of said body and said joint being without a metal enclosure around said further insulation.

* * * * *